US007008024B2

(12) United States Patent
Piel et al.

(10) Patent No.: US 7,008,024 B2
(45) Date of Patent: Mar. 7, 2006

(54) BRAKE-BOOSTER WITH COMPLEMENTARY HYDRAULIC POWER-ASSIST

(75) Inventors: Jean-Marc Piel, Livry Gargan (FR); Nicolas Marlhe, Marly la Ville (FR); Stéphane Gendrinl, Bruz (FR)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 10/433,466

(22) PCT Filed: Nov. 26, 2001

(86) PCT No.: PCT/FR01/03713

§ 371 (c)(1),
(2), (4) Date: Mar. 19, 2004

(87) PCT Pub. No.: WO02/43997

PCT Pub. Date: Jun. 6, 2002

(65) Prior Publication Data

US 2004/0140713 A1    Jul. 22, 2004

(30) Foreign Application Priority Data

Nov. 29, 2000  (FR) .................................. 00 15544

(51) Int. Cl.
*B60T 13/44*      (2006.01)
(52) U.S. Cl. .................................. 303/114.3

(58) Field of Classification Search .. 303/114.1–114.3; 91/369.1–376 R; 60/548–590
See application file for complete search history.

(56) References Cited

U.S. PATENT DOCUMENTS

| 5,236,257 | A  | * | 8/1993  | Monzaki et al. ......... 303/114.1 |
| 5,842,751 | A  | * | 12/1998 | Unterforsthuber ....... 303/115.3 |
| 6,398,316 | B1 | * | 6/2002  | Mizutani et al. ......... 303/114.3 |
| 6,439,674 | B1 | * | 8/2002  | Niino ......................... 303/152 |
| 6,460,944 | B1 | * | 10/2002 | Isono et al. ................ 303/159 |
| 6,715,846 | B1 | * | 4/2004  | Pueschel et al. ......... 303/114.3 |
| 6,739,676 | B1 | * | 5/2004  | Isono et al. ............. 303/114.3 |

* cited by examiner

Primary Examiner—Christopher P. Schwartz
(74) Attorney, Agent, or Firm—Lee H McCormick, Jr.; Warren Comstock

(57) ABSTRACT

A pneumatic-hydraulic hybrid pneumatic brake booster is improved. Additional hydraulic boosting (19, 20) provided by a hydraulic circuit is provided beyond a saturation point (Psat) in the operation of the pneumatic circuit. Hysteresis-induced instabilities in the pneumatic part of the booster are taken into consideration (50). A choice is made to compensate (A) for the shortfall in operation of the pneumatic circuit using the hydraulic circuit. In one example, this correction is afforded via a microprocessor which imposes a corrected process signal. Using this signal, pressure shifts in the pneumatic system are neutralized.

2 Claims, 1 Drawing Sheet

BRAKE-BOOSTER WITH COMPLEMENTARY HYDRAULIC POWER-ASSIST

BACKGROUND OF THE INVENTION

The subject of the present invention is a pneumatic brake-booster with additional hydraulic boosting and a method for boosting braking using such a booster. An object of the invention is to make the operation of the additional boost effect more reliable and make a braking action perfectly linear as a function of a braking command. The field of application of the invention is more generally that of the general control of the braking of a vehicle.

A pneumatic brake-booster comprises, in principle, a variable-volume front chamber separated from a rear chamber, the volume of which is also variable, by a partition formed by a sealed and flexible diaphragm and by a rigid skirt plate. The rigid skirt drives a pneumatic piston bearing, via a push rod, on a primary piston of a master cylinder of a hydraulic braking circuit, typically a tandem master cylinder. The front chamber, on the master cylinder side, is connected pneumatically to a source of vacuum. The rear chamber, on the opposite side to the front chamber, and placed on the brake pedal side, is connected pneumatically, in a way controlled by a valve, to a source of driving fluid, typically air at atmospheric pressure. At rest, that is to say when a driver is not pressing on the brake pedal, the front and rear chambers are connected together, where as the rear chamber is isolated from atmospheric pressure. Under braking, the front chamber is first of all isolated from the rear chamber, then air is let into the rear chamber. This letting-in of air has the effect of driving the partition and of implementing pneumatic boosting of the braking.

Hydraulic brake boosting effects are known from elsewhere. Typically, an electric motor is connected to a hydraulic pump which injects a fluid under pressure into the braking circuits when these are called upon. Control of this electric motor is provided by measuring the pressures obtaining in the front and rear chambers of the pneumatic brake-booster. Use is therefore made of two pressure detectors, which are connected pneumatically to each of these chambers, so as to measure the pressure. These detectors provide electrical signals that represent these pressures.

The additional hydraulic boost system has the main objective, as is known, of contriving to prevent the wheels from locking under sudden braking. Such a system, which is known as an anti-lock braking system, or as ABS, allows the hydraulic pressure in the braking circuit to be modulated. This system makes it possible to apply, or alternatively, not to apply, additional hydraulic pressure to the hydraulic circuit so that the pressure applied exceeds or does not exceed a limiting pressure beyond which the wheels will lock up.

A change to these additional hydraulic boost braking circuits has been dictated by the reduction in weight of the vehicles. What has happened is that this reduction has led to a reduction in the size of the pneumatic brake-booster, the size of the front and rear chambers. Because of the size reduction, and because the high pressure used is atmospheric pressure (which is practically always the same), the boost effect afforded by the pneumatic boosting has seen a reduction in its effectiveness. The object of additional hydraulic boosting is therefore to afford additional boosting, which tends to apply to the hydraulic circuit a raised hydraulic pressure so that a hydraulic pressure which is higher than the one needed to cause the wheels of a vehicle being braked to lock up can be reached.

In practice, the pneumatic boost function links the force of effort exerted by a driver to the hydraulic pressure of the braking circuit, namely the effectiveness of the braking, in a linear way. However, this linear relationship is achieved only as long as the high pressure let into the rear chamber can exert a boosted braking effort. In practice, there is equilibrium in the position of a brake pedal. This equilibrium results, on the one hand from the effort exerted by the driver added to the pneumatic boosting, and, on the other hand, from the hydraulic reaction of the braking circuit. In order to avoid driver fatigue, a ratio between the pneumatic boosting and this driver effort, which is of the order of five, or other values depending on the various systems are allowed.

From the moment when the rear chamber of the pneumatic booster is subjected to atmospheric pressure (and can no longer be subjected to a higher pressure) and the front chamber is subjected to the maximum depression that the vacuum pump can produce, the pneumatic boosting no longer comes into effect. Under these conditions, the additional component of the braking effort is provided only by the driver. The pressure obtaining in the hydraulic circuit when this phenomenon occurs is known as the saturation pressure.

The curve of the correspondence between the pressure in the master cylinder and the force exerted by the driver therefore experiences an initial increase along a slope known as the boost slope, which is fairly steep as far as this saturation pressure value. It then evolves with a far shallower slope, due only to the effort on the part of the driver.

When the pneumatic boost braking system was bulky, this saturation pressure was above the pressure at which the wheels of the vehicle locked up. It was then left to the driver, or alternatively to an anti-lock braking system, to keep this other problem in check. However, because of the reduction in the size of pneumatic boosters, the saturation pressure is now reached in the hydraulic circuit before the pressure at which the wheels lock up is reached. To this end, an additional hydraulic boost circuit, typically a hydraulic pump, takes over from this pneumatic boosting action.

This additional boosting, for good driveability, has nontheless to occur in continuity with the efforts deployed by this driver. This means that the ratio between the effort exerted by the driver and the hydraulic pressure acting on the wheels have to be the same as, or similar to, the ratio that already existed at the time that the additional hydraulic boosting comes into operation. Corresponding to the saturation pressure in the hydraulic circuit, there is an effort known as the saturation effort for which this saturation pressure is reached. The effort exerted by the driver is therefore measured in the additional hydraulic boost circuits, the saturation effort is subtracted, and the difference is multiplied by the coefficient of amplification that already existed during pneumatic boosting.

By taking this approach the result obtained as far as the driver is concerned is therefore that the boosting occurs always with the same effectiveness, whether it is pneumatic or hydraulic in origin. The driver is unaware of the difference. In order to measure the saturation pressure or the saturation effort, there are various conceivable systems, the principle of which is to compare with one another the pressures that exist at the time of this saturation in the front chambers, rear chambers or various points of the hydraulic circuit.

However, under certain circumstances such an additional hydraulic boost system operates in an abnormal and troublesome way. This abnormal and troublesome operation stems from a sharp increase in the vacuum in the front chamber during braking. This sharp increase in the vacuum may, for example, be brought about by engaging a lower gear in the gearbox. This lower gear itself leads to the engine turning over faster (engine braking) which leads to a greater intake and therefore a stronger depression created in the front chamber.

The origin of this greater depression in the front chamber may also be the result of operation of a non-return valve present on the intake of the vacuum into this front chamber. What happens is that a calibrated leakage of low value, for example 15 millibar per second, causes an increase in pressure in the front chamber. It is possible for the pressure in the front chamber, as a result of this leakage, to exceed the set pressure of this non-return valve. Under these conditions, the front chamber is once again subjected to the vacuum. The set pressure of a non-return valve such as this is of the order of 25 millibar. As a result, a sudden depression of the order of 25 millibar may be applied to the front chamber.

If both phenomena, the engaging of a lower gear in the gearbox, and the refreshing of the vacuum in the front chamber, occur simultaneously, it is possible for the front chamber to experience an additional depression, of the order of 50 millibar. In this case, and if the pneumatic booster is in the saturation region, misadjustment of the additional hydraulic boost system occurs. Everything therefore happens as if this sharply applied depression were interpreted by the additional hydraulic boost circuit as a sudden effort applied by the driver. The amplification phenomenon afforded by the additional hydraulic boosting then leads to excessive braking which tends to cause the wheels to lock up immediately. In practice, this phenomenon is compensated for by the ABS cutting in, so that no decremental effect on driving occurs. However, in the exceptional case where such a situation might occur, a solution such as this is disagreeable and unsatisfactory.

SUMMARY OF THE INVENTION

The invention seeks to overcome this problem. In the invention, the solution found consists in compensating for the offset, the hysteresis-induced operation of the pneumatic boost circuit by rapid recalibration in the hydraulic circuit. In order to determine this hysteresis-type operation, the invention therefore measures parameters concerned with pressures obtaining in the front and/or rear chambers and/or in the hydraulic circuit prior to the implementation of the additional hydraulic boosting. Then, constantly, when this additional hydraulic boosting is activated, these parameters with their current values are compared with the parameters already recorded. If, through these comparisons, a modification to the conditions in which the additional hydraulic boosting has been implemented is detected, this additional hydraulic boosting is modified to avoid untimely misadjustments: overbraking or even brake release. In practice, in the invention, the pressure is measured in the front chamber prior to implementation of the additional hydraulic boost circuit, and this pressure in the front chamber is measured again constantly at the time of use. The value of the saturation pressure that is used is modified as a function of this variation (if any) of this depression in the front chamber. By taking this approach, jerky braking is avoided.

A subject of the invention is therefore a pneumatic brake-booster comprising a front chamber that can be connected to a source of vacuum, a rear chamber that can be connected to a high-pressure inlet, a sealed moving partition between the two chambers, a moving gear carried along with the moving partition and connected to a hydraulic braking circuit, a device for letting a high-pressure fluid into the rear chamber at the time of braking, and additional hydraulic boost means equipped with a hydraulic actuator, characterized in that these additional boost means further comprise an electronic circuit which stores in memory a first pressure obtaining in one of the chambers, prior to implementation of these additional boost means, which measures a second pressure obtaining in one of the chambers during this implementation, and which controls the actuator as a function of a difference between this first and this second pressure.

In a preferred embodiment, the measurements are taken in the front chamber.

Another subject of the invention is a method for boosting braking using a pneumatic brake-booster in which a pneumatic brake boosting device is implemented in the booster, a hydraulic brake boosting device is implemented in addition in the booster, a function of the boosting by the hydraulic device depends on a first depression state in the pneumatic device prior to implementation of the hydraulic device, characterized in that, during braking, a second depression state is measured in the pneumatic device after implementation of the hydraulic device, and the function of the hydraulic boosting is modified as a function of a difference in measurements between this first and this second state.

The invention will be better understood upon reading the description which follows and upon examining the accompanying figures. These are given merely by way of non-limiting indication of the invention.

DETAILED DESCRIPTION OF THE INVENTION

Figure 1:
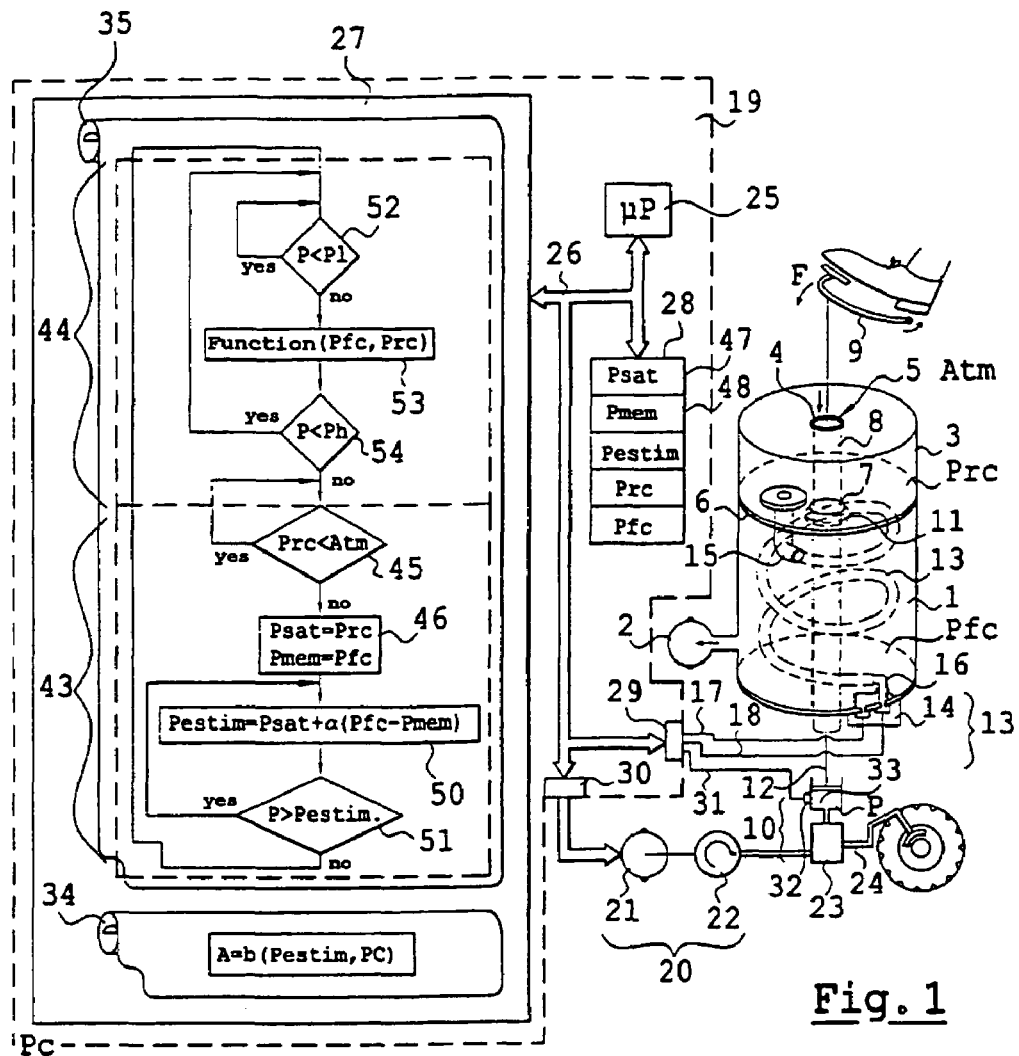
FIG. 1: A schematic depiction of a pneumatic booster for boosting the hydraulic braking according to the invention.

FIG. 1 shows a pneumatic brake-booster according to the invention comprising a front chamber 1 that can be connected to a source of vacuum 2. Typically, the source 2 may consist of inlet gases being trapped for a vehicle with a petrol engine. In the case of a vehicle with a diesel engine, use would be made of an external vacuum pump. The pneumatic brake-booster also comprises a rear chamber 3 that can be connected, for example via a schematic valve 4, to a high-pressure inlet 5 (typically ambient air at atmospheric pressure Atm). The pneumatic brake-booster also comprises a moving partition 6 habitually equipped with a rigid skirt and with a sealed diaphragm. The diaphragm prevents pneumatic communication between the two chambers. The diaphragm 6 is pierced with a sealed orifice 7 to allow a moving gear 8 to pass. The gear 8 is mechanically connected on the one hand to a brake pedal 9 and, on the other hand, to a hydraulic braking circuit 10. The principle of boosting afforded by such a pneumatic brake-booster is as follows. Under the action of the pedal 9, the moving gear 8 plunges into the rear chamber uncovering the valve 4 via which ambient air is let into the rear chamber 3. The ambient air then exerts pressure on the partition 6 which, via a thrust face 11 secured to the moving gear 8, drives the moving gear 8 in such a way that one end 12 thereof actuates the hydraulic braking circuit 10.

In addition, in the preferred example, the pneumatic brake-booster comprises a helical flexible hose 13. The helical flexible hose 13 allows the rear chamber 3 to be connected in a sealed manner to a pressure detector 14 mounted at the front of the front chamber. The helical flexible hose 13 opens into the rear chamber 3, through the partition 6, via a pipe 15. Another pipe 16 connects the flexible hose 13 to the detector 14. The detector 14 also faces another orifice of the front chamber. The detector 14 is thus capable of producing two signals transmitted by connections 17 and 18 to an electronic control circuit 19. The detector 14 therefore picks up pressure information transmitted by the connection 17 which relates to a pressure Pfc obtaining in the front chamber 1 and, by the connection 18, to a pressure Prc obtaining in the rear chamber 3.

Means for the additional hydraulic boosting of the pneumatic brake-booster comprise, in principle, a hydraulic actuator 20 here equipped with an electric motor 21 which drives a pump 22. Via a coupling 23, the pump 22 injects a hydraulic fluid into one of the ducts 24 of the hydraulic circuit 10. Implementation of the hydraulic boosting 20 supplements (or neutralizes in the case of the anti-lock braking system) the rise in pressure in the duct 24.

In the invention, the additional hydraulic boost means further comprise the electronic circuit 19, here depicted in a conventional way by a microprocessor 25 connected by a control, address and data bus 26 to a program memory 27, to a data memory 28, to an input interface 29 and to an output interface 30. The connections 17 and 18 are connected to the interface 29 together with a connection 31 from a detector 32 of the pressure Pc obtaining in a master cylinder 33 of the hydraulic circuit 10. In practice, the electronic circuit 19 may form a microcontroller (microprocessor equipped with its program memory on one and the same integrated circuit).

The program memory 27 comprises, in a known way, a first program 34 intended to produce a control signal A to be applied, by the interface 30, to control the hydraulic boosting 20. The program memory 27 also comprises, according to the invention, another program 35, the contents of which will be explained later on. From a practical point of view, the programs 34 and 35 may be merged into one single program, it being possible for the electronic circuit 19 to be considered as being a state machine with programmed transitions.

Figure 2:
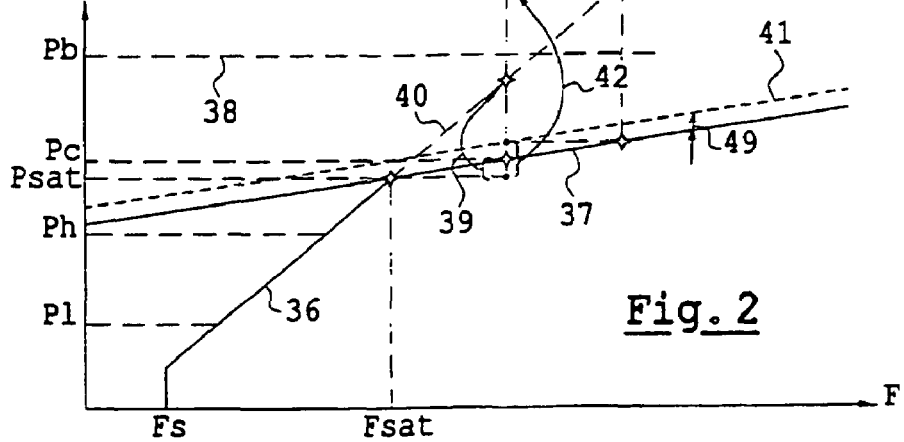
FIG. 2: A diagram showing the correspondence between an effort exerted by a driver and a pressure obtaining in a brake master cylinder, with and without the additional hydraulic boosting device of the invention.

FIG. 2 shows the principle of brake boosting for a system equipped with pneumatic then hydraulic boosting. On the abscissa axis, the diagram indicates the efforts F exerted by the driver of the vehicle to brake his vehicle. On the ordinate axis are depicted the pressures Pc in the master cylinder which result from the efforts F. When the driver brakes, to begin with, his effort opposes the reactions of the pedal alone. Then, for an effort higher than a given threshold Fs, the boosted braking comes into operation. At the time of this boosted braking, the curve showing the correspondence between the pressure Pc and the effort F approximately follows a straight line 36 known as the boost line, indicating that the pressure in the master cylinder is the result, on the one hand, of the effort F and, on the other hand, of the boosting afforded by the pneumatic brake-booster 1.

This proportional relationship is applied up to the point where the force F reaches a force known as the saturation force Fsat. A pressure in the master cylinder equal to Psat corresponds to the force Fsat. Where Pc is equal to Psat, the pressure in the rear chamber 3 has become equal to atmospheric pressure, and additional opening of the valve 4 can no longer provide pneumatic boosting. In this case, without additional boosting, the correspondence curve follows a straight line 37 of direct correspondence in which only the effort applied by the driver causes the pressure in the hydraulic circuit 10 to increase.

FIG. 2 also shows a horizontal line 38 indicating the pressure Pb for which the wheels of the vehicle lock up. In the example schematically shown, because of the reduction in the size of the pneumatic brake-booster, the pneumatic boosting is not enough to achieve this lock up pressure without exaggerated pressure from the foot on the pedal 9. FIG. 2 also shows, schematically by the arrow 39, the effect of the hydraulic amplification afforded by the program 34 of the circuit 19. In principle, this program 34 measures the difference in pressure between the current pressure Pc in the master cylinder and the pressure Psat at which boosting according to the straight line 36 ended. The pressure difference Pc−Psat is multiplied by a multiplicative coefficient by the program 34, and a corresponding command A is applied to the input of the motor 21 so that the pressure available in the circuit 24 is increased, upwards of the current pressure Pc, by a supplement which is proportional to the difference between the pressures Pc and Psat. This is represented schematically by the continuation 40 of the boost line 36.

The problem caused by a sharp increase in the depression in the front chamber 1 is depicted schematically by the curve 41 in dotted line which is roughly parallel to the straight line 37 and situated slightly above it. When the pressure in the front chamber drops sharply, as a result of this depression, and because the foot of the driver is not at that moment moving on the pedal (the phenomenon is too swift), the skirt 6 is moved until the above-mentioned equilibrium is regained. As, on the one side, the combination of the effort by the foot plus the depression increases sharply, this then results in a sharp increase in the current pressure Pc measured by the detector 32. Instead then of using, as a corrective term, a difference current pressure Pc (before the sudden depression)−Psat, the difference taken into consideration is now equal to the previous difference increased by the sudden overpressure. What this means is that instead of the correspondence 39, the additional hydraulic boosting provides a boost effect 42. As this boost effect 42 is too great, the effort exerted on the wheel exceeds the lock up pressure Pb. In this case, the wheel locks up, the anti-lock braking system comes into operation. This results in an unpleasant driving experience.

In the invention, in order to overcome this problem, a decision is taken during the second phase 43 of the program 35 to check, in real time, one or more pressures at various parts of the circuit by comparison with the values that these pressures had at the time when the pneumatic boosting reached saturation. The phase 43 is after a phase 44 of this same program 35. This phase 44 will be explained later on. The second phase 43 comprising a first test 45 during which measurements are taken to determine whether the pressure in the rear chamber is lower than atmospheric pressure: Prc lower than Patm. What happens is that if this pressure Prc is lower than atmospheric pressure, the pneumatic booster 1 still has the capability to afford its assistance. If this is the case, the test 45 loops back on itself at high frequency, for example of 1 MHz. The entire microprocessor 25 may run at a higher speed (easily 100 MHz at the present time). By taking this approach it is possible to detect, to within a microsecond, the exact moment at which the pressure in the rear chamber 3 reaches atmospheric pressure. If need be, the clock frequencies of the microprocessor 25 will be changed in order to take temporal precision considerations into account.

When the pressure in the rear chamber is no longer lower than atmospheric pressure, during step 46 initiated immediately after this test 45 (in the next microsecond), the current pressure Pc is measured and is stored in memory as value Psat in a recording zone 47 of the memory 28. The pressure Pfc in the front chamber is also measured and stored in memory in zone 48 under the name of a variable Pmen. Once this has been done, two parameters which are important in monitoring phenomena 49 of increase in depression in the front chamber 1 have been measured. However, it could be shown that detecting these phenomena 49 can be achieved by measuring pressures at other points. Indeed, all the pressure values are linked to one another. A detection delay may possibly be observed if other pressures are measured for this purpose.

During a step 50 immediately following step 46, for example in the same microsecond as step 46, a variable known as Pestim is made to adopt a value equal to Psat+α (Pfc−Pmem). In doing this, when Pfc is equal to Pmem, the result obtained is that the first time Pestim is equal to Psat. On the other hand, it can be clearly seen that if the current pressure in the front chamber Pfc, is caused to change, the correction afforded by the step 50 makes it possible to take the difference into account. To do this, in the program 34, the calculation of the command A is performed on the basis of Pestim. Any difference can therefore be tolerated without difficulty, because they are neutralized by step 50.

It then remains to be determined, on the one hand, how the sharp increase in the depression in the front chamber is detected, and how, incidentally, the coefficient α is calculated. To detect the sharp depression in the front chamber 1, a test 51 (after step 50) allows the current pressure Pc to be compared with the corrected value of the saturation pressure: Pestim. What happens is that under normal circumstances the current pressure Pc is greater than Pestim (which at the start is equal to Psat). If this is the case, the step 50 and the test 51 are undertaken in a loop. In step 50, each time a new value of Pfc is taken into consideration.

The mere presence of step 50 and of the normal looping back of the test 51 when this pressure Pc is greater than Pestim leads, at a frequency of recurrence equal to the recurrence of this looping-back, to the modification Pfc in the depression in the front chamber being taken immediately into consideration. For example, the loop-back frequency of step 50 and the test 51 can be allowed to be equal to the order of 1 MHz. This looping-back leads to a slight delay in perception equal to one microsecond. However, given the inertia of the various mechanisms involved, the motor 21, the pump 22, not forgetting the braking linkages themselves, the correction is applied before the error can have detrimental effects.

On the other hand, if the current pressure Pc drops below the estimated pressure Pestim, that is to say, in practice, below Psat, then the additional hydraulic boosting is no longer needed. In this case, the system loops back to the first phase 44.

In practice, during that phase, the value of the coefficient α is measured. The value of the coefficient α is quite simply a representation of the slope of the boost line 36. Given the existence of the triggering threshold Fs, a decision is taken during the test 52 in phase 44, not to begin to take the slope 36 into consideration unless the current pressure Pc measured by the sensor 32 is higher than a lower learning pressure Pl, itself located after the jump of Fs. What happens in the invention is that it is reckoned that if this current pressure is higher than this lower learning pressure, the correspondence of the curve 36 is linear and can be taken into consideration. In this case, during a later step 53, α is calculated. The value of α is a function, at any moment, of the pressure in the front chamber Pfc and in the rear chamber Prc. Moreover, this correspondence could be established also by using the measured current pressure Pc. Indeed, given the aforementioned equilibrium, these three pressures are mutually coherent and connected by a unique relationship. In so doing, the calculation of step 53 is repeated as long as a subsequent test 54 has not revealed that the current hydraulic pressure has reached a higher learning threshold Ph. During this period, the test 52 and the step 53 are performed in a loop. The calculation of step 53 corresponds to the adjustments which were undertaken in the prior art in order to ensure continuity of the proportions 36 and 40. The specific feature of the invention, however, lies in the fact that this calculation is undertaken upon each fresh braking action. As a result, no standardized calibration of the equipment is needed: this calibration is performed automatically. It therefore takes account of the ageing of the device.

When this threshold Ph is reached, the program 35 enters the phase 43. It is not necessary for the looping back of the steps 52, 53 and 54 to be as swift as the looping back of the test 45 and of steps 50 and 51. However, for reasons of consistency, it may be permissible for the scrutinization to occur at the same frequency, 1 MHz in one example. In other words, the first phase 44 is intended to measure α in a part of the curve 36 where the curve is perfectly linear. Given the offsets at the origin of the curve 36, it may be necessary to formulate the coefficient α and the slope of this curve on the basis of two successive measurements (between an end point and an origin point of a segment carried by the straight line 36). If the intention is to simplify the calculation, this straight line may be assumed to pass approximately through the origin of the x- and y-axes, the value of the slope α being obtained using just a single point, the last one measured before the test 54.

The invention claimed is:

1. A pneumatic brake-booster comprising a front chamber (1) that is connected to a source of vacuum (2), a rear chamber (3) that is connected to a high-pressure inlet (5), a sealed moving partition (6) between the front and rear chambers, a moving gear (8) that is carried along with the moving partition and connected to a hydraulic braking circuit (10), a valve device (4) for letting a high-pressure fluid into the rear chamber at the time of braking, and a hydraulic actuator (20) for providing hydraulic fluid to said braking circuit (10) to assist said pneumatic brake booster in effecting a brake application, characterized in that said hydraulic actuator (20) is responsive to an electronic circuit (19) during as brake application said electronic circuit (19) being defined by a memory (48) that stores a first pressure (Pmem) measured in said front chamber(1), a second pressure (pfc) measured in said rear chamber (3) during a brake application and controls (34, A) the actuator (19) as a function (α) of a difference (Pestim) between the first pressure and the second pressure, said electronic circuit (19) comprises a microprocessor (25) and a programmable memory (27) containing a recorded program (34, 35) for producing a signal (A) to be applied to the hydraulic actuator (19), the value of said signal being a function of the difference between a third pressure measurement (Pc) of the hydraulic pressure at a point in the hydraulic circuit (10) and an estimated value of a hydraulic pressure in the hydraulic circuit (10) wherein the estimated value (Pestim) of the hydraulic pressure is compared (51) with a current value (Pc) of the third pressure measurement, and the estimated pressure is corrected (50) when the estimated pressure (Pestim) is lower than the current third pressure measurement (Pc).

2. A method for boosting braking using a pneumatic brake-booster in which a pneumatic brake boosting device (1–8) is implemented to provide pressurized fluid to a circuit (10) to effect a brake application;

a hydraulic brake boosting device (19, 20) is implemented in assist said pneumatic brake boosting device (1–8) in effecting the brake application, the implementation of said a hydraulic brake boosting device (19, 20) being a function of a first depression state (Pmem) in the pneumatic device during the brake application, characterized in that second depression state (Pfc) is measured (14) in the pneumatic device (1–8) after implementation of the hydraulic device (19,20), and the function of the hydraulic boosting is thereafter modified (50) as a function of a difference in measurements between the first depression state (Pmem) and the second depression state (Pfc) as further modified by a signal (A) that is proportional to the difference between a third pressure measurement (Pc) of a current hydraulic pressure at a point in the brake circuit (10) and an estimated value (Pestim) of the current hydraulic pressure is the brake circuit (10), the estimated value of the hydraulic pressure as compared with a current value of the hydraulic pressure in the brake circuit (10) being continually corrected as long as the estimated hydraulic pressure remains lower than the current value of the hydraulic pressure.

* * * * *